Jan. 15, 1963   S. P. KISH   3,072,971
PLASTIC FIXTURE AND METHOD OF MAKING THE SAME
Filed Dec. 19, 1958   4 Sheets-Sheet 3
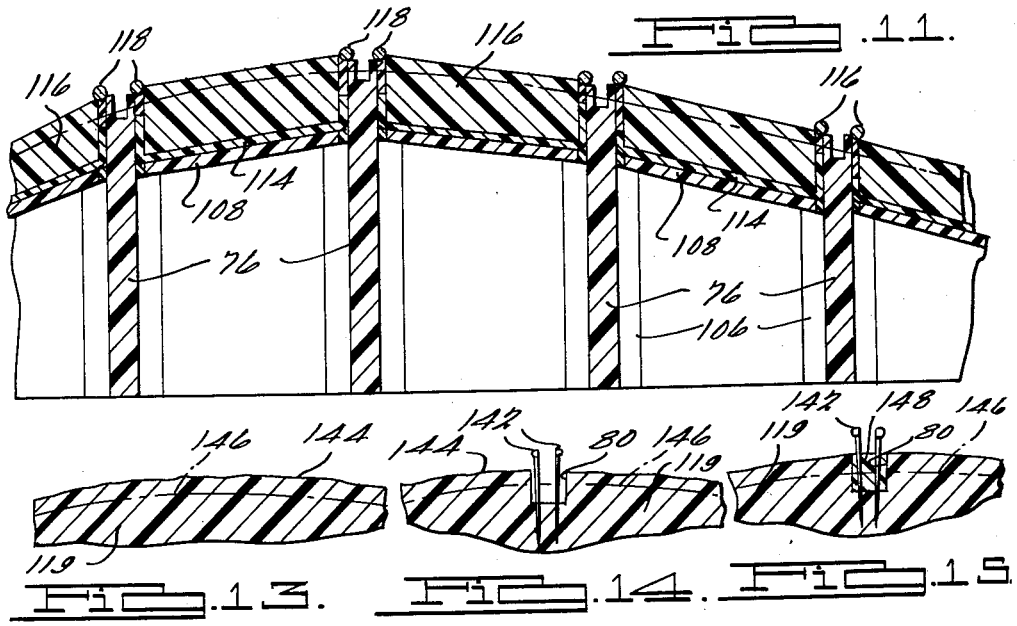
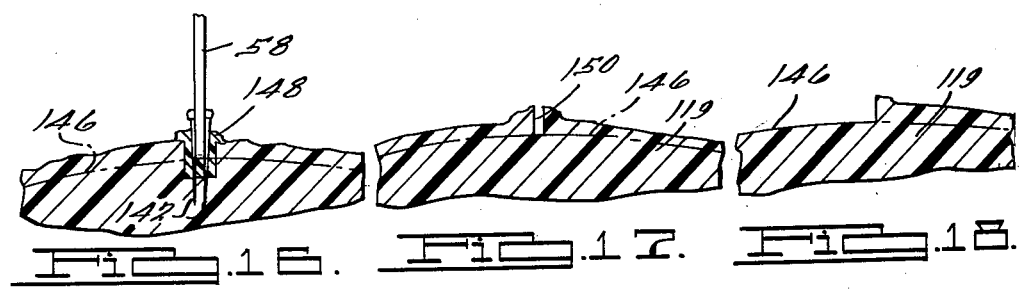
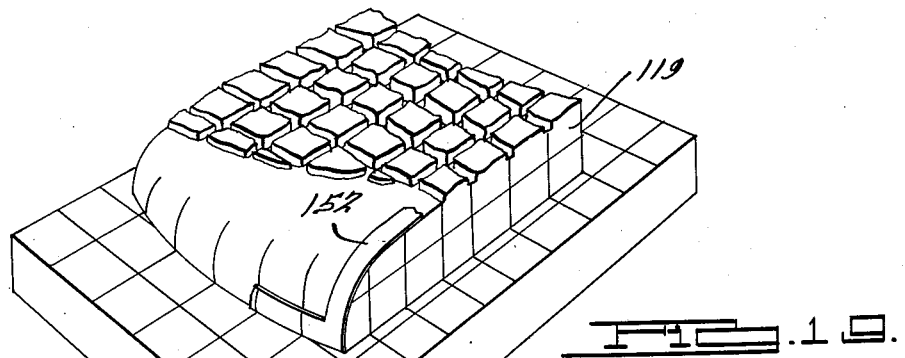
INVENTOR.
Steven P. Kish
BY
Harness, Dickey & Pierce
ATTORNEYS

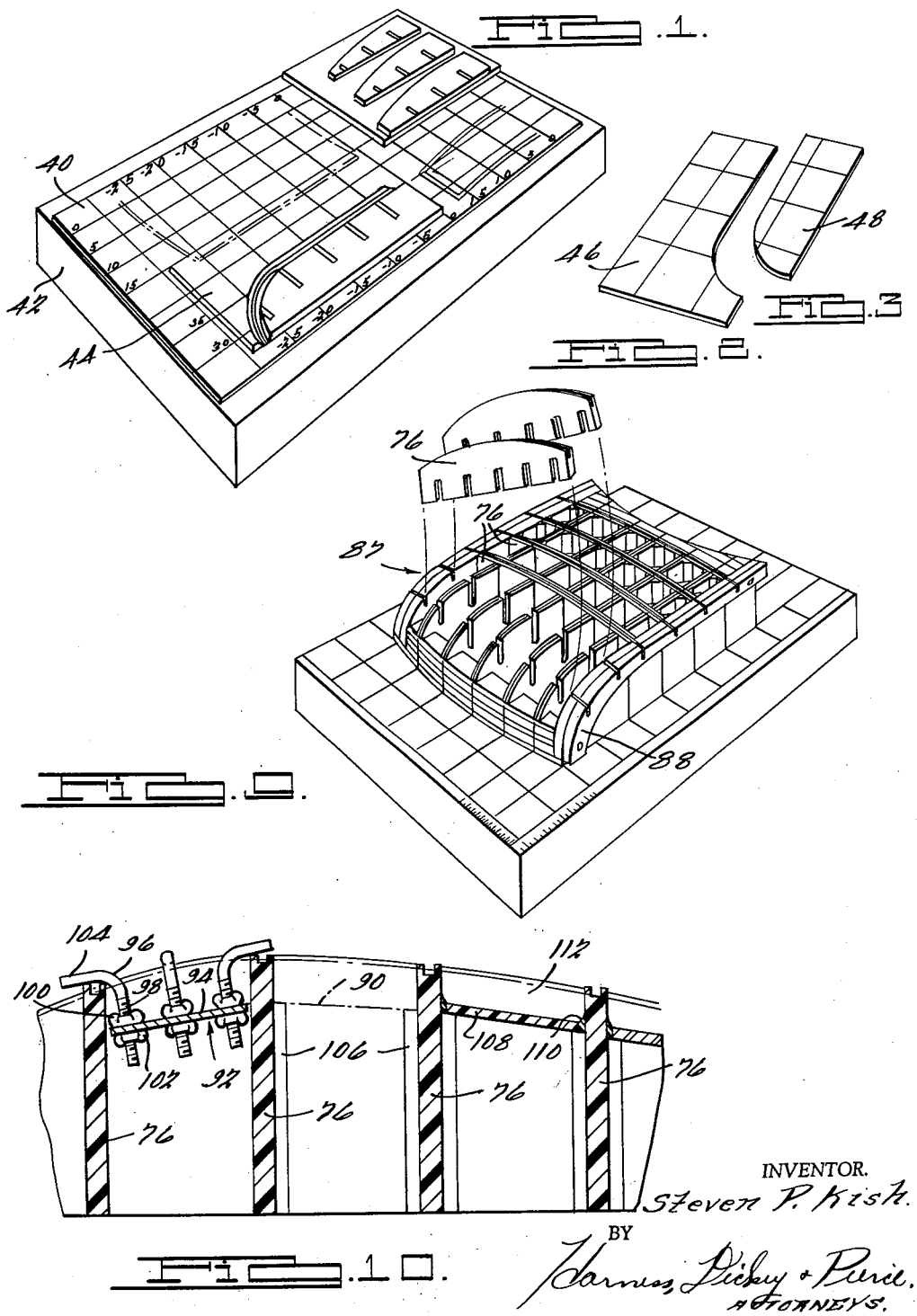

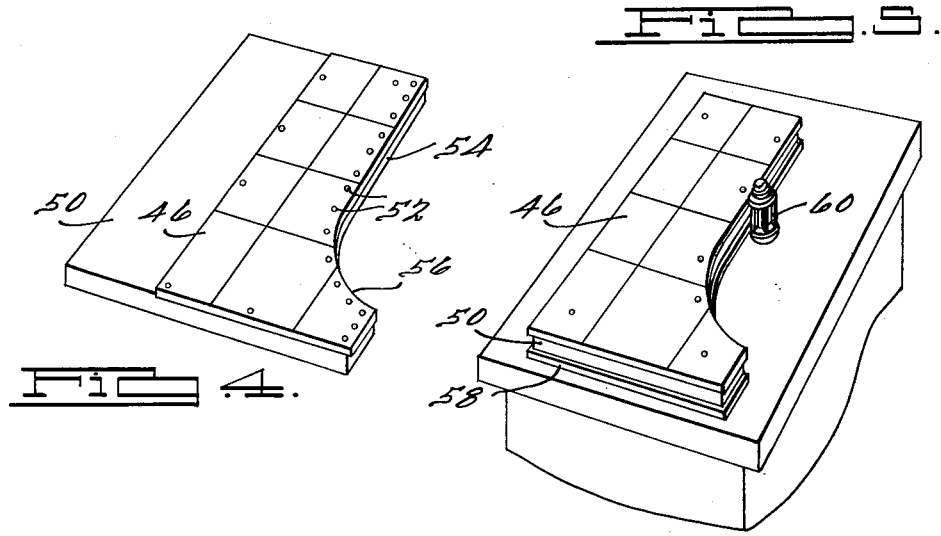
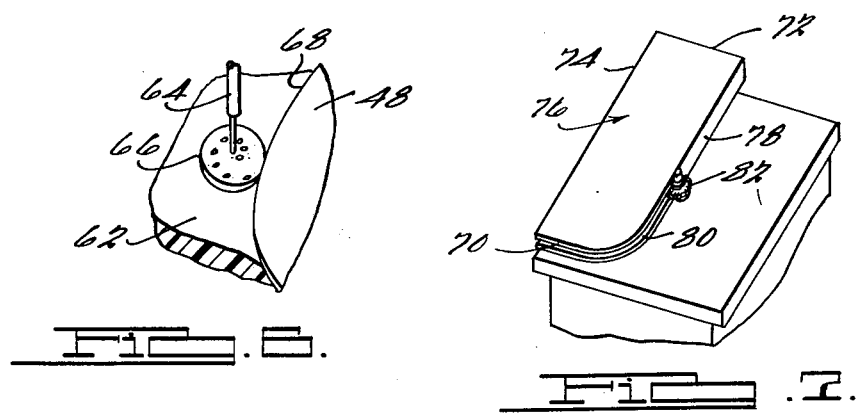
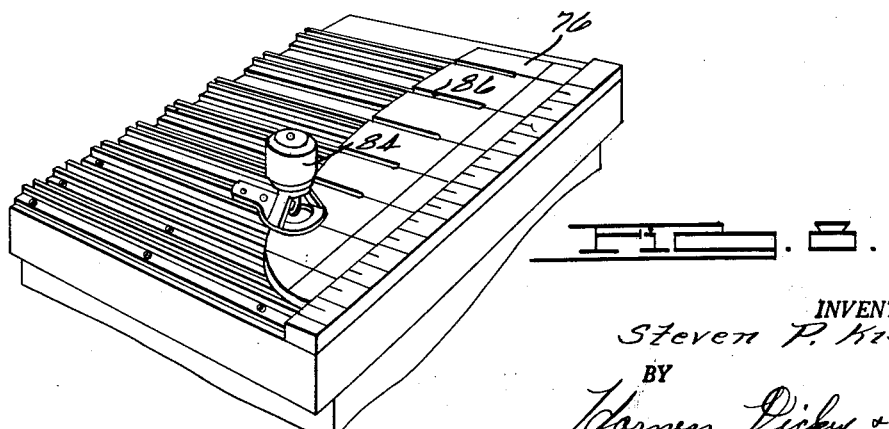

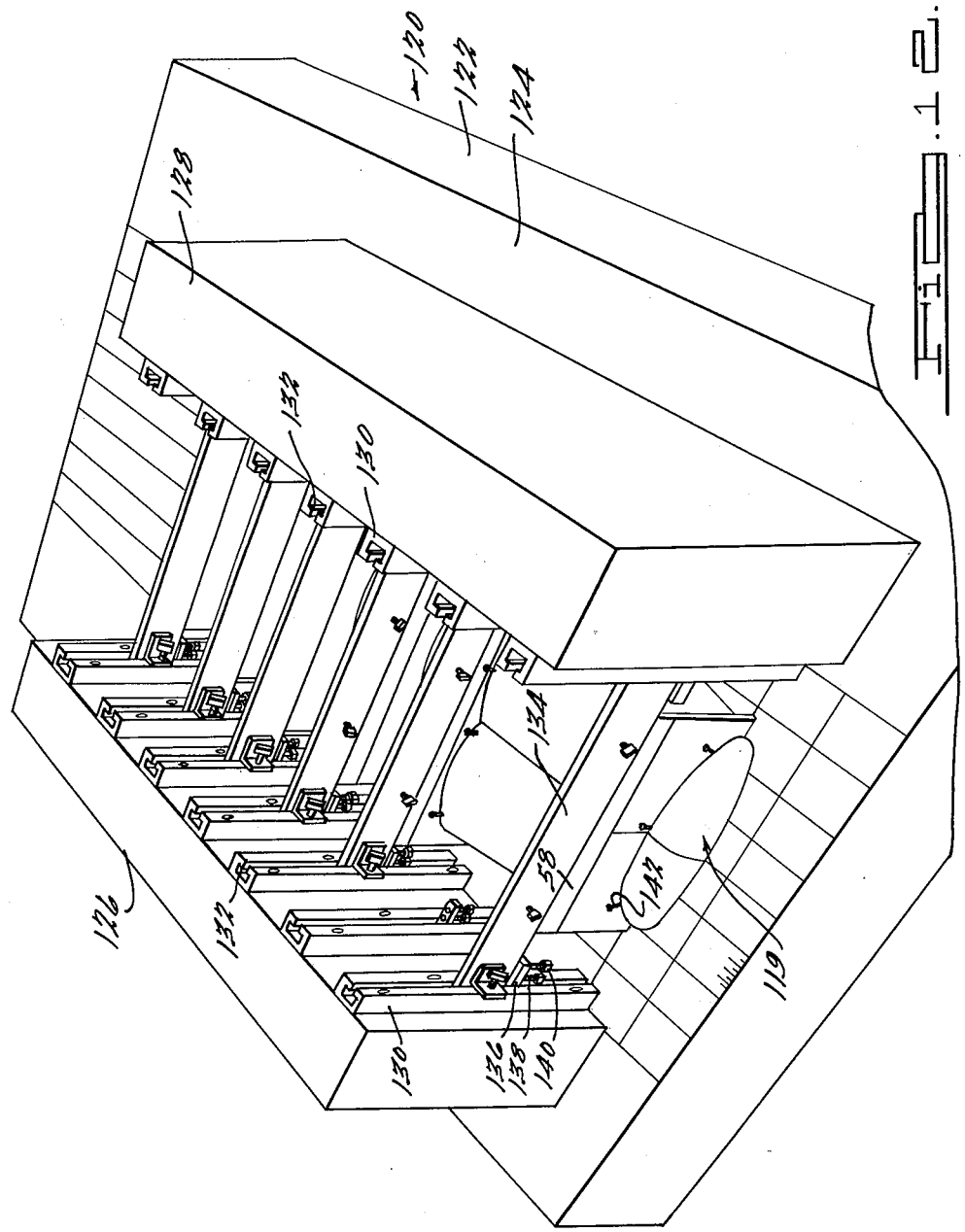

United States Patent Office 3,072,971
Patented Jan. 15, 1963

3,072,971
PLASTIC FIXTURE AND METHOD OF
MAKING THE SAME
Steven Peter Kish, 1301 Turner St., Lansing, Mich.
Filed Dec. 19, 1958, Ser. No. 781,522
10 Claims. (Cl. 18—59)

This invention relates to the art of tool or fixture making and is concerned particularly with an improved plastic fixture construction and an improved method of making plastic fixtures.

In the automobile industry for example, the production of a new body style involves a number of expensive and time consuming tooling operations. The usual procedure, after the new style has been approved, is to make a quarter size three-dimensional model of modeling clay using as guides artists' sketches made during the preliminary planning stage. Any changes deemed necessary or desirable are made to this model, and a full size clay model is then made again using artists' sketches and perhaps preliminary body drafts that have been made in the meantime.

A master model of wood is then made. This wooden model takes a long time to make and it is expensive. Accordinglyy, it is very valuable. In addition to the above, it is necessary to have a great many additional fixtures patterned on the master model. For example, it is necessary to have die models for use in the machining of dies to be used in the manufacture of production parts. It is necessary to have spotting racks for checking the production dies. It is necessary to have checking fixtures for inspecting the mass produced parts. In some cases it may be necessary to have hammer forms or other die elements to assist in the manufacture of preliminary or prototype samples of production parts or even in the actual manufacture of the production parts themselves. Also, it is sometimes necessary to have assembly bucks in which the manufactured parts are placed and held securely and rigidly in the desired shape or form while stiffening or reinforcing ribs or the like are welded or otherwise fastened thereto.

The entire tooling operation usually is distributed among a number of different job shops which may be widely separated geographically, and it is necessary therefore to have a relatively large number of duplicate models (or "model duplications" as they are referred to in the trade) which reproduce exactly the form of the master model, for distribution to the various shops in which the actual tools are made. Also, in the course of the tooling operation, it may be necessary to reproduce tool components and to distribute them among the various job shops in order to coordinate the efforts of all the job shop operators and to assure a proper fit between the production parts ultimately produced.

The word "fixture" is used herein as a collective term designating all of the tool devices hereinabove described.

An important object of the present invention is to provide a novel method of making fixtures of plastic resin material which greatly reduces the time required for tooling and correspondingly reduces the expense of tooling.

Another object of the invention is to provide an improved construction for the various fixtures that facilitates and expedites manufacture thereof and that provides an end product of exceptional dimensional stability.

Still another object of the invention is to provide a novel construction for plastic fixtures of the above type that can be made up directly from the engineering drawings or body drafts that almost invariably are made early in the development of a new body style and that does not require the use of the clay models heretofore deemed essential by the automobile industry, at least, as a preliminary step in every tooling operation.

Other objects and advantages of the invention will be apparent during the course of the following description.

In the drawings, forming a part of this specification and wherein like numerals are employed to designate like parts throughout the same, FIGURE 1 is a perspective view showing the manner in which paralin or celluloid templates are made from body drafts or styling drawings as a preliminary step in the manufacture of fixtures according to the present invention, FIGS. 2 and 3 are perspective views showing female and male templates, respectively, produced as shown in FIGURE 1, FIG. 4 is a perspective view showing one of the paralin templates fastened to a wooden spacer as a subsequent step in the method of this invention, FIG. 5 is a perspective view showing the manner in which permanent aluminum templates are made from the paralin templates, FIG. 6 is a perspective view showing how plastic templates are made from the paralin male templates as another step in the method of this invention, FIG. 7 is a perspective view showing the manner in which male plastic templates are grooved along the contour edges thereof preparatory to assembly as part of a fixture embodying the invention, FIG. 8 is a perspective view showing how the plastic male templates are cut for half-lap assembly in the manufacture of a fixture, FIG. 9 is a perspective view showing a preliminary lattice framework made from the assembled plastic templates, FIG. 10 is a fragmentary sectional view of the lattice framework shown in FIG. 9 and illustrating a further step in the manufacture of the fixture, FIG. 11 is a view similar to FIG. 10 and particularly illustrating a subsequent step in the manufacture of the fixture, FIG. 12 is a perspective view of a special template setting jig illustrating the manner in which aluminum female templates produced as shown in FIG. 5 are used together with the partly completed model shown in FIG. 11 in a subsequent step in the manufacture of a finished fixture, FIGS. 13–18 illustrate progressive steps employed in finishing the fixture after the female templates shown in FIG. 12 are removed, FIG. 19 is a perspective view showing the final step of completing the fixture.

As suggested, in the automobile industry, body drawings or drafts are prepared as a preliminary step in the production of every new model, and these drawings show the highlight or outline shapes of the various body parts, as well as progressive vertical sectional contour or profile outlines, both longitudinally and transversely, for each body part. Usually, sectional profile views are provided at five inch intervals along the length and width of each part. These styling drawings or body drafts are usually made directly from the artists' sketches and before the three-dimensional preliminary models are made.

It is the purpose of this invention to provide techniques for producing a master model and all of the tooling required for production directly from these styling drawings. In this manner it is possible to eliminate the time and expense heretofore required in the production of preliminary quarter size and full size clay models and the more precise and much more expensive wood models. It is contemplated that the master model and all of the tools be made of plastic by procedures that permit the tooling to be completed much more quickly and much less expensively than heretofore.

To the above end, the styling drawing or body draft 40 is placed on a flat board or base 42 and a separate template is made of each section shown on the drawing. In each instance, the template is made by placing a transparent sheet 44 of paralin or celluloid on the drawing over the section line to be reproduced. The section line is visible through the transparent material of the sheet 44 and it can be reproduced exactly on the top surface of the sheet using a suitable scribing tool of a type commonly used by draftsmen for this purpose. Thereafter, the sheet 44 is broken apart or separated at the scribe line to produce the female template 46 shown in FIG. 2 and the male template 48 shown in FIG. 3.

A male and a female template is provided in the manner hereinabove described for each section line shown on the drawing 40. Each template so made is suitably numbered or otherwise correlated with the particular section line represented thereby for ease in later identification and use.

Thereafter, it is necessary as an intermediate step in the method of this invention to make a permanent template duplication of each female template 46 as the paralin or celluloid material from which the original templates are made is too soft, too flexible and too brittle for use in subsequent steps of the method of this invention. The female templates 46 preferably are duplicated in sheet aluminum. To this end, each template 46 is fastened to a board 50 of plywood or the like by thumbtacks 52 or equivalent means. As shown in FIG. 4, the board 50 is approximately the same length as the template 46 and it is formed with a similar profile edge 54 which corresponds to but is recessed or set back from the corresponding profile edge 56 of the template 46. The board 50 is then trimmed flush with the back edge of the template 46 and laid on a sheet of aluminum template stock 58, as shown in FIG. 5. In this arrangement, the board 50 serves as a spacer which permits the aluminum sheet 58 to be cut to the same identical shape as the template 46 using a cuter 60. The profile edge of the template 46 is used as a guide in making the aluminum template 58. The aluminum templates are then suitably marked for identification and set aside for later use in a manner hereinafter described.

At the same time the female templates 46 are duplicated in sheet aluminum, the male templates 48 are reproduced in oversize dimension using a plastic board material, as shown in FIG. 6. Any suitable plastic material can be used. Epoxy resin materials have been found preeminently satisfactory. Plastic boards of a desired thickness can be made conveniently by casting the plastic material in a suitable mold and then curing the cast material to form the board. In any event, each aluminum male template 48 is superimposed on a suitable piece of plastic board material 62, as shown in FIG. 6, and the outline of the template is scratched on the board 62 using a scribing tool 64 or the like and a spacer 66 which keeps the tool a fixed predetermined distance from the profile edge 68 of the template. The ends 70 and 72 and the bottom edge 74 of the template 48 are reproduced exactly on the plastic board 62. Thus, in the template outline, as scribed on the plastic board 62 the ends 70 and 72 and the bottom edge 74 are exactly coincident with the corresponding edges of the aluminum template 48 and the profile or edge thereof is spaced outwardly from or oversize an amount determined by the spacer 66. In practice, the contour edge 68 usually is made about one-eighth inch oversize. The result is the male plastic template 76 shown in FIG. 7.

The plastic templates 76 are relatively thick as shown in the drawing, and the profile edge 78 of each template is formed with a longitudinal, medial groove 80 which can be made in any suitable manner as with a shaper (not shown) having a slotting cutter 82, as illustrated diagrammatically in FIG. 7. The groove 80 should be deeper than the oversize marginal portion made by the spacer 66.

The next step is to assemble the male templates in lattice construction. To this end, the plastic templates 76 are slotted for half-lap assembly as shown in FIG. 8 using a router 84. If the templates are made on five inch centers according to conventional practice they are formed with a plurality of half-lap grooves 86 spaced five inches apart. In order that the transverse and longitudinal templates interfit properly they are grooved from opposite sides. For example, the longitudinal templates may be grooved from the top (FIG. 8) and the transverse templates are then grooved from the bottom (FIG. 9). In each instance the grooves 86 are extended slightly beyond the middle of the template so that there will be no interference when the templates are fitted togeher in the lattice framework, as shown in FIG. 9.

The lattice framework 87 formed by the interfitted and assembled templates is then fitted in and suitably bonded to an outer ring assembly 88 built up preferably from plastic board material and shaped to plan view templates produced from the body draft 40. Resilient epoxy resin materials are available for use as bonding agents, and, if the plastic templates 76 are made of epoxy resin, they preferably are secured together by a resilient epoxy bonding agent. This bonding material provides some resiliency in the joints between the templates and between the templates and the built-up ring assembly 88 which makes the finished product better able to resist sudden shocks or blows and to better withstand normal handling and abuse. Also, the resilient bonding material tends to relieve stresses in the structure at the joints between the lattice frame members 76 and prevents locally created stresses due to curing of the plastic or other causes from extending across the lattice structure and perhaps compounding their effect to cause warping or twisting of the structure.

When the templates 76 are thus assembled the profile edges thereof collectively define a gridwork of reference lines spaced slightly above a predetermined surface contour defined by the body draft profile lines. Also, the essentially rigid lattice structure 87 formed by the templates 76 clearly embodies in a three-dimensional form the general skeletal shape and contour of the final form to be made therefrom.

Next, the openings or cells of the lattice frame-work 87 are filled with plastic material. This is best done by fitting precast plastic blocks in the lattice openings to form a shell of sufficient thickness to permit working of the fixture as hereinafter described. To this end a line 90 is scribed on the side wall of each lattice opening a desired distance below the top profile edges of the templates 76 surrounding the opening. The distance the line 90 is spaced below the edges of the templates corresponds to the thickness of the precast block to be inserted in the opening. More particularly, a spacer gauge 92 of the type shown in FIG. 10 conveniently can be used in scribing the depth line 90. FIG. 10 is a progressive view showing three adjacent lattice openings in the fixture. The spacer gauge 92 is in the opening at the left.

The gauge 92 here shown comprises a generally square plate 94 which is sufficiently smaller than the lattice openings so that it fits readily therein and can be easily moved to different inclined positions. However, the plate 94 should fit the lattice openings sufficiently snugly so that the scribe line 90 can be made in each instance simply by running the scribing tool along the edges of the plate 94. In order to hold the plate 94 at the desired uniform depth in the lattice openings, a plurality of L-shaped bolts 96 are attached to the plate 94 adjacent the edges thereof with the threaded shank portions 98 of the bolts extending through the plate substantially at right angles thereto. Wing nuts 100 and 102 on the bolts 96 at opposite sides of the plate 94 hold the bolts securely attached to the plate with the angularly bent terminal portions 104 thereof extending outwardly from and parallel to the plate. Three or four L-bolts 96 are mounted on the plate 94, and the bolts preferably are spaced uniformly around the periphery of the plate.

When the bolts 96 are adjusted with the terminal portions 104 thereof spaced uniformly above the plate 94, they suspend the plate at the desired depth in the lattice openings. It is merely necessary to drop the spacer gauge into one of the lattice openings and the L-bolts 96 automatically position it at the proper depth and at an angle corresponding to the general slope or pitch of that portion of the contour surface in which it is mounted. With the plate 94 suspended in this manner, the scribe line 90 can be formed easily and quickly by running the scribing tool around the four edges of the plate and against the adjacent walls of the opening. Moreover, it will be readily apparent that the spacer gauge 92 can be moved easily and quickly from one lattice opening to the other until scribe lines 90 have been made in each opening. In this connection, it will be apparent that, inasmuch as the lattice templates are spaced uniformly apart, the spacer gauge 92 will fit with substantially the same clearance in all of the lattice openings. Also, it will be apparent that the L-bolts 96 will arrange the plate 94 automatically at the proper pitch or slope to be parallel with the particular portion of the contour surface in which it is mounted.

After all of the lattice openings have been scribed, corner posts 106 are placed in the four corners of each lattice opening with the upper ends thereof flush with the scribe lines 90, as shown in the middle lattice opening of FIG. 10. These posts 106 preferably are of plastic material, and they are bonded to the templates 76 by a resilient resin bonding material of the type hereinabove described.

Relatively thin square plates 108 of plastic board material are then dropped onto the posts 106 as shown in the right lattice opening of FIG. 10. The plates 108 preferably fit the lattice openings relatively snugly and they are joined by a suitable plastic bonding material to the posts and to the adjacent templates 76. Fillets 110 of plastic resin material are then placed along the top edges of the plates 108 and precast blocks 112 are dropped into the lattice openings on top of the plates. The blocks 112 are formed to fit the lattice openings relatively snugly and when they are pressed against the plastic fillets 110, the latter well up into and fill the joints between the blocks 112 and the templates 76. Any excess plastic rising above the blocks 112 is scraped or wiped away. Sufficient fillet material 110 should be placed in the openings to assure complete filling of the joints in every instance. The blocks 112 are sufficiently thick to extend substantially flush with the oversize profile edges of the templates 76. When the plastic fillet material 110 sets or cures, it bonds the blocks 112 solidly in place and forms a monolithic outer shell on the lattice framework 87 which completes and conforms generally to the contour surface defined by the profile edges of the lattice templates 76. Stresses created in the structure by curing of the fillet material 110 are so small as to be insignificant and such stresses as are created are interrupted and localized by the templates 76 and absorbed by the resilient bonding material interconnecting the templates. Substantially the entire mass of the rough fixture shape thus far produced is in the precast components, such as the templates 76, the posts 106, the plates 108 and the filler blocks 112. Thus, while all of these elements are of plastic material none of them, by their mere presence in the fixture, create any great stresses which tend to destroy the dimensional stability of the fixture.

Instead of making the filler blocks 112 close fitting and bonding them in place by fillets 110 of plastic material, as illustrated in FIG. 10, the alternative procedure shown in FIG. 11 can be used. In the alternative method, a quantity of plastic resin material 114 is placed in the lattice openings on the plates 108, and an undersize filler block 116 is dropped into each opening. The blocks 116 are then squashed into the plastic material 114 to cause the latter to rise at least part way up along the sides of the blocks, as shown in the drawing. Preferably, the blocks 116 are pushed into the plastic material at least far enough to bring the top surfaces thereof flush or substantially flush with the profile edges of the templates 76. Caulking rope or plastic fillet material 118 is then pressed into the joints between the blocks 116 and the templates 76 and the caulking rope preferably is sufficiently oversize so that it wedges into the joint but does not extend any substantial distance therein. A separate caulking rope is provided for each lattice opening so that each piece of caulking rope extends around its respective filler block. The ends of each piece of caulking rope are spaced apart to provide a sprue opening and sufficient additional uncured plastic resin material is then poured into the sprue to fill the joint between the block and the templates. If, in any particular instance, the filler block 116 is inclined from the horizontal, as are those shown in FIG. 11, the sprue opening is provided at the high side of the block to assure complete filling of the joint.

The partially finished plastic fixture hereinabove described is then transferred to a template setting jig 120 which preferably is of the type shown in FIG. 12. The jig 120 comprises a base 122 having a flat top surface 124 and parallel upright side walls 126 and 128 spaced a sufficient distance apart to accommodate the plastic fixture therebetween. Mounted on the inner sides of the walls 126 and 128 are vertical guide bars 130 having confronting ways 132 therein which receive the ends of horizontal slides 134. The latter carry aluminum female templates 58 previously made as hereinabove described and illustrated in FIG. 5.

The guide bars 130 and consequently the templates 58 are spaced the same distance apart as the template lines on the body draft. Thus, if the template lines are taken every five inches according to conventional practice, the guide bars 130 are spaced five inches apart. Also, the aluminum templates 58 are arranged in the same order as the transverse male templates 76 in the fixture so that each aluminum template 58 is the female counterpart of a corresponding fixture template. Since the aluminum templates 58 are spaced the same distance apart as the plastic templates 76, each aluminum template is directly over its corresponding plastic template and the profile bottom edge of the aluminum template overhangs the groove 80 in its respective plastic template.

The slides 134 are movable vertically in their respective ways 132 to raise or lower the templates 58 carried thereby. Vertically adjustable stops 136 also are carried by the guide bars 130, and the stops are disposed under the slides 134 to limit downward movement thereof. Each stop 136 is held in a desired vertically adjusted position in any suitable or conventional manner to support the slide 134 associated therewith. Each stop 136 has a pair of adjusting screws 138 and 140 which engage and support the slide.

In practice, the stops 136 are positioned at the approximate height specified by the body draft, and the adjusting screw 138 is manipulated to bring the slide 136 to the final adjusted position. It is desirable in this connection that the profile edges of the templates 58 be positioned by screws 138 precisely at the required height above the surface 124. When properly adjusted the profile edges of the templates 58 all are received in grooves 50 in the top surface of the fixture and precisely on the theoretical contour surface of the fixture.

In connection with the foregoing, it will be recalled that the plastic templates 76 were all made oversize so that the profile edges thereof necessarily extend above the height specified by the body draft. It is important in this connection that the excess material thus provided on the profile edges of the templates 76 be sufficient to compensate for any misalignment of the templates that may recur during fabrication of the lattice framework 87 and to compensate for any warping that may occur in the fixture due to stresses created therein as plastic resin material used in its fabrication hardens or sets. By the time the fixture reaches the stage where it is ready to be placed in the template jig 120, it is essentially stable dimensionally. Any error or warping that is going to occur will have occurred by that time and it is an essentially stable permanent article. Also, in every instance, the grooves 80 in the plastic templates 76 are cut deep enough so that they extend below the height specified by the body draft. Thus, the profile edge of every aluminum template 58 is received within and spaced above the bottom of a respective groove 80. If desired, suitable guides such as spaced nails 142 can be provided in the fixture to guide the aluminum templates 58 precisely to a desired location relative to the fixture and to compensate for any flexure or bending of the templates 58 that may occur in the portions thereof extending below the essentially strong and rigid guide bars 134. As suggested, nails conventionally are driven into the plastic material of the fixture to guide the aluminum templates 58 and the preferred procedure is to space the nails in each groove in parallel rows which embrace and closely fit the templates.

After the aluminum templates 58 are positioned and precisely located in the manner described, they are raised to a position above the fixture by means of the adjusting screws 140. All of the grooves 80 are then filled with plastic resin material and the templates are again lowered onto the preset adjusting screws 138 by backing off or retracting the screws 140.

This plastic material is permitted to harden or set and the templates 58 are again disengaged from the fixture by tightening the adjusting screws 140.

The above procedure is then repeated using correspondingly spaced longitudinal aluminum templates 58 in the template setting jig 120.

The amount of material used in the grooves 80 is so small that stress created by curing of this material is never sufficient to warp or twist the fixture itself. The strength, rigidity and dimensional stability of the latter in every instance is sufficient to hold the fixture precisely in its original shape. The final result is a checkerboard of grooves in the top surface of the fixture whose bottom surfaces conform exactly with the contour surface as determined by the sectional profile lines on the body draft. The fixture itself is entirely of plastic and because of the manner in which it is constructed it will not thereafter warp or otherwise change its shape. The profile reference lines established in its contour surface by the aluminum templates 58 are permanent and fixed and precisely according to the shape dictated by the body draft.

Attention is now directed to FIGS. 13–18 which are progressive views showing diagrammatically the steps performed in the template setting jig 120.

More particularly, FIG. 13 shows the fixture 119 having an oversize top surface 144. Specifically, the top surface 144 extends the distance shown above a theoretical finished surface represented by the broken line 146 to which the fixture must be reduced in order to make it conform to the contour surface called for by the body draft. FIG. 14 shows a groove 80 in the oversize top surface 146 of fixture 119 and illustrates the manner in which the groove extends below the theoretical finished surface 146. Also, FIG. 14 illustrates the manner in which guide nails 142 are embedded in the fixture 119 to guide and locate the aluminum templates 58 (not shown). FIG. 15 shows the groove 80 filled with plastic resin material 148. FIG. 16 shows an aluminum template 58 embedded in the plastic resin material 148 with the profile edge thereof on the theoretical finished surface 146. FIG. 17 illustrates the appearance of the fixture after the plastic resin material 148 has dried and become an integral part of the monolithic plastic structure of the fixture. Also, FIG. 17 shows that the bottom surface of the groove 150 which is left when the aluminum template 58 is lifted from the fixture after the plastic material 148 has hardened or set is flush or coincident with the theoretical finished surface 146. Thereafter, the top surface of the fixture 119 is cut back and contoured to the theoretical finished surface 146 by means of conventional woodworking tools using the grooves 150 as references.

FIG. 19 shows the fixture 119 in perspective partially reworked in the manner described. The finished product is a three-dimensional monolithic plastic figure which exactly reproduces the form skeletally represented by the template profiles of the body draft. The form can be made quickly and relatively inexpensively by following the procedures hereinabove described and the resulting form is accurate and dimensionally stable.

It is perhaps significant to note at this point that the above procedure also offers a quick and convenient way of making forms either to inside-of-metal or to outside-of-metal. Both parts may be required for example in the manufacture of production dies. Body drafts conventionally are made to inside-of-metal and the fixture produced in the manner hereinabove described therefore represents the inside-of-metal contour. In order to adapt this fixture to outside-of-metal it is merely necessary to superimpose on the top contour surface of the fixture a sheet 152 of a suitable resin material having the same thickness as the metal to be formed in the dies. For example, a sheet form of epoxy resin is available on the market which is flexible and moldable so as to be readily conformable to the contour surface of the fixture and which is sufficiently hard and tough to withstand handling and abuse to which the fixture normally is subjected in use. The sheet material 152 can be bonded to the fixture 119 in any suitable or conventional manner and it then becomes an integral part of the fixture.

It will thus be seen that I have achieved the objects of my invention. I have provided a novel construction for plastic tools or fixtures which greatly reduces the time required for tooling and correspondingly reduces the expense of tooling. Fixtures made according to the teachings of this invention are exceptionally stable dimensionally. The novel structure and method described permits preliminary models and possibly the entire tooling program to be made up directly from engineering drawings or body drafts and thus permits the tooling program to be launched at an earlier stage than has heretofore been possible.

Having thus described the invention, I claim:

1. The method of making plastic fixtures comprising fabricating a lattice framework of preformed longitudinal and transverse oversize templates of a material having working characteristics similar to plastic and having edge profiles extending above a predetermined surface contour and provided in said edge profiles with grooves extending below said surface contour, placing a moldable plastic material in the grooves of said templates to a level above said predetermined surface contour and establishing reference lines on said contour by impressing templates conforming to said lines in said plastic material, and then curing the plastic material to fix said reference lines, filling the lattice openings with plastic material, and finishing the same to said predetermined surface contour using the reference lines established by said last mentioned templates as guides.

2. The method of making plastic fixtures comprising fabricating a lattice framework of interfitted preformed oversize plastic templates having edge profiles extending above a predetermined surface contour and provided in said edge profiles with grooves extending below said surface contour, bonding the templates together with a resilient plastic material, placing a moldable plastic material in the grooves of said templates to a level above said predetermined surface contour and establishing reference lines on said contour by impressing templates conforming to said lines in said plastic material, then curing the plastic material to fix said reference lines, filling the lattice openings with plastic material and finishing the same to said predetermined surface contour using the reference lines established by said last mentioned templates as guides, stresses created in said fixture by the plastic material in said lattice openings being interrupted and localized by said templates and said plastic bonding material to render said fixture relatively dimensionally stable.

3. The method of making plastic fixtures comprising fabricating a lattice framework of interfitted preformed oversize plastic templates having edge profiles extending above a predetermined surface contour and provided in said edge profiles with grooves extending below said surface contour, casting a plastic material into the lattice openings, curing said plastic material, internal stresses in said blocks due to curing being interrupted and absorbed by said templates, placing a moldable plastic material in the grooves of said templates to a level above said predetermined surface contour and establishing reference lines on said contour by impressing templates conforming to said lines in said plastic material, then curing said last mentioned plastic material to fix said reference lines, and then conforming plastic material in said lattice openings to said predetermined surface contour using said reference lines as guides.

4. The method of making plastic fixtures comprising fabricating a lattice framework of interfitted preformed oversize templates of a material having working characteristics similar to plastic and having edge profiles extending above a predetermined surface contour and provided in said edge profiles with grooves extending below said surface contour, bonding said templates together to form a unitary structure, fitting preformed blocks of plastic material in the lattice openings with the top surfaces of said blocks disposed above said predetermined surface contour and bonding said blocks to said templates with plastic material, placing a moldable plastic material in the grooves of said templates to a level above said predetermined surface contour and establishing reference lines on said contour by impressing other templates conforming to said lines in said plastic material and then curing the plastic material to fix said reference lines, and then cutting back the profile edges of said first-mentioned templates and said blocks of plastic material to said predetermined surface contour using said reference lines as guides.

5. The method of making plastic fixtures comprising fabricating a lattice framework of interfitted preformed oversize plastic templates having edge profiles extending above a predetermined surface contour and provided in said edge profiles with grooves extending below said surface contour, fastening corner posts in the lower portions of the lattice openings at the intersections of said templates, mounting supporting plates in the lattice openings on said corner posts, filling the lattice openings above said supporting plates with plastic material, placing a moldable plastic material in the grooves of said templates to a level above said predetermined surface contour and establishing reference lines on said contour by impressing other templates conforming to said lines in said plastic material and then curing the plastic material to fix said reference lines, and then conforming the plastic templates and the plastic material in said lattice openings to said predetermined surface contour using said reference lines as guides.

6. The method of making plastic fixtures comprising fabricating a lattice framework of interfitted preformed oversize plastic templates having edge profiles extending above a predetermined surface contour and provided in said edge profiles with grooves extending below said surface contour, placing corner posts in the lower portions of said lattice openings at the intersections of the templates and bonding said posts to said templates with plastic material, mounting supporting plates on said corner posts and sealing the joints between said plates and said templates with plastic material, mounting preformed filler blocks of plastic material on said supporting plates with the top surfaces of said blocks extending above said predetermined surface contour and sealing the joints between said blocks and said templates with plastic material, placing a moldable plastic material in the grooves of said templates to a level above said predetermined surface contour and establishing reference lines on said contour by impressing other templates conforming to said lines in said plastic material and then curing the plastic material to fix said reference lines, and then forming the profile edges of said plastic templates and said filler blocks to said predetermined surface contour using said reference lines as guides.

7. The method of making plastic fixtures comprising fabricating a lattice framework of interfitted preformed oversize plastic templates having edge profiles extending above a predetermined surface contour and provided in said edge profiles with grooves extending below said surface contour, placing posts in the lower portions of said lattice openings at the corners thereof and bonding the same to said templates, mounting preformed plastic blocks in said lattice openings using said corner posts as supports with the top surfaces of the blocks extending above said predetermined surface contour and sealing the joints between said blocks and said templates with plastic material, placing a moldable plastic material in the grooves of said templates to a level above said predetermined surface contour and establishing reference lines on said contour by impressing other templates conforming to said lines in said plastic material and curing the plastic material to fix said reference lines, and then finishing the profile edges of said plastic templates and said plastic blocks to said predetermined surface contour using said reference lines as guides.

8. The method of making plastic fixtures comprising fabricating a lattice framework of interfitted preformed oversize templates of a material having working characteristics similar to plastic and having edge profiles extending above a predetermined surface contour and provided in said edges with grooves extending below said surface contour, mounting supporting plates in the lattice openings a predetermined distance below said surface contour superimposing preformed filler blocks of plastic material on said supporting plates with the top surfaces of the blocks above said predetermined surface contour and sealing the joints between said blocks and said templates with a plastic bonding material, said bonding material and said templates forming a unitary integral plastic body and said templates interrupting and localizing stresses occurring in any part of said fixture, placing a moldable plastic material in the grooves of said templates to a level above said predetermined surface contour and establishing reference lines on said contour by impressing other templates conforming to said lines in said plastic material and curing the plastic material to fix said reference lines, and then cutting the profile edges of said first-mentioned templates and said filler blocks back to said predetermined surface contour using said reference lines as guides.

9. The method of making plastic fixtures comprising fabricating a lattice framework of interfitted preformed oversize plastic templates having edge profiles extending above a predetermined surface contour and provided in said edge profiles with grooves extending below said surface contour, placing posts at the corners of said lattice openings and bonding said posts to said templates, mounting supporting plates in the lattice openings on said corner posts to provide pockets in the upper portions of said lattice openings, placing moldable plastic bonding material in said pockets, pressing preformed blocks of plastic material into said pockets and against said bonding material to cause the latter to well up and fill the spaces between said blocks and said templates and then curing said bonding material, whereby said templates, said blocks and said bonding material form an integral monolithic plastic structure and whereby said templates interrupt and localize stresses created in the fixture by curing of said plastic bonding material, placing a moldable plastic material in the grooves of said templates to a level above said predetermined surface contour and establishing reference lines on said contour by impressing other templates conforming to said lines in said plastic material and then curing the plastic material to fix said reference lines, and then conforming the profile edges of said plastic templates and said filler blocks to said predetermined surface contour using said reference lines as guides.

10. The method of making plastic fixtures comprising fabricating a lattice framework of interfitted preformed oversize plastic templates having edge profiles extending above a predetermined surface contour and provided in said edge profiles with grooves extending below said surface contour, fastening posts to said templates in the lower portions and at the corners of the lattice openings, mounting supporting plates in said lattice openings on said posts, placing preformed filler blocks of plastic material in the lattice openings on said supporting plates with the top surfaces of said filler blocks extending above said predetermined surface contour, casting plastic bonding material into said lattice openings around said filler blocks to bond the latter to said templates and to provide a unitary monolithic plastic surface on said framework, placing a moldable plastic material in the grooves of said templates to a level above said predetermined surface contour and establishing reference lines on said contour by impressing other templates conforming to said lines in said plastic material and then curing the plastic material to fix said reference lines, and then conforming the profile edges of said plastic templates, said casting material and said filler blocks to said predetermined surface contour using said reference lines as guides.

References Cited in the file of this patent

UNITED STATES PATENTS

| | | |
|---|---|---|
| 2,262,473 | Stewart | Nov. 11, 1941 |
| 2,262,474 | Stewart | Nov. 11, 1941 |
| 2,625,748 | Renaud | Jan. 20, 1953 |
| 2,632,922 | Kish | Mar. 31, 1953 |
| 2,724,868 | Kish | Nov. 29, 1955 |
| 2,777,790 | Kish | Jan. 15, 1957 |
| 2,887,726 | Verlin | May 26, 1959 |

FOREIGN PATENTS

| | | |
|---|---|---|
| 749,242 | Great Britain | May 23, 1956 |